B. BRUHN.
HEAT REGENERATOR FOR CEMENT KILNS.
APPLICATION FILED FEB. 2, 1910.

1,043,901.

Patented Nov. 12, 1912.
2 SHEETS—SHEET 1.

Fig. 1.

Witnesses
J. F. Tolan
H. Schoenthal

Inventor
Bruno Bruhn
By N. P. McElroy
Attorney

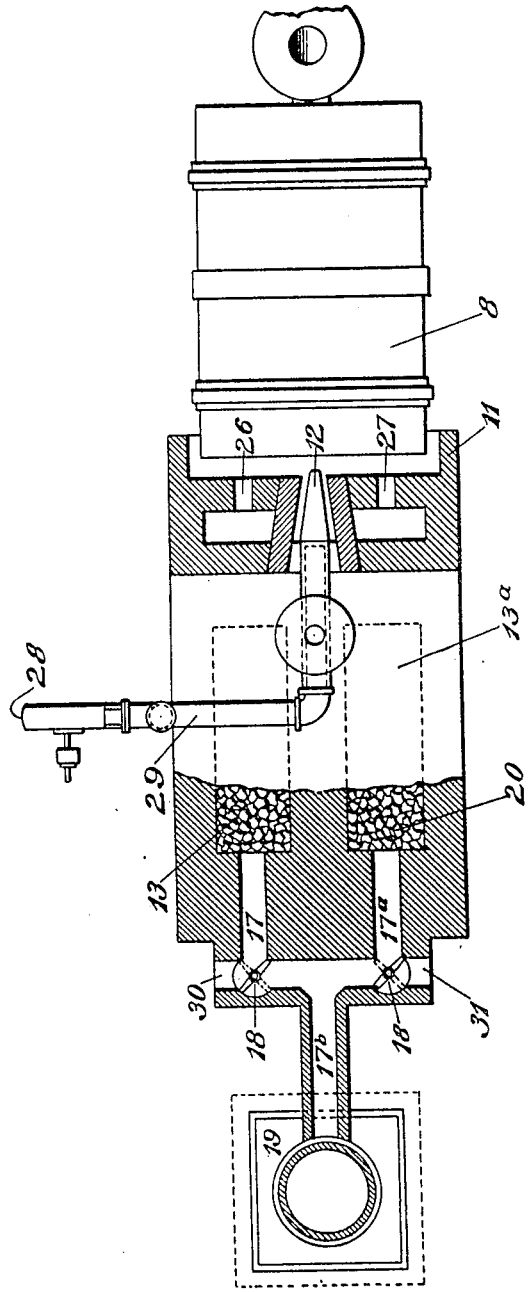

// BEST AVAILABLE COPY

UNITED STATES PATENT OFFICE.

BRUNO BRUHN, OF CHARLOTTENBURG, GERMANY, ASSIGNOR TO THE COMMERCIAL RESEARCH COMPANY, OF NEW YORK, N. Y., A CORPORATION OF NEW YORK.

HEAT-REGENERATOR FOR CEMENT-KILNS.

1,043,901.  Specification of Letters Patent.  Patented Nov. 12, 1912.

Application filed February 2, 1910. Serial No. 541,658.

*To all whom it may concern:*

Be it known that I, BRUNO BRUHN, chemist, a subject of the German Emperor, residing at 7 Giesebrechtstrasse, Charlottenburg, near Berlin, Germany, have invented new and useful Improvements in Heat-Regenerators for Cement-Kilns, of which the following is a specification.

This invention relates to heat regenerators for cement kilns; and it comprises a heat regenerator provided with a lining or filling material comprising cement; all as more fully hereinafter set forth and as claimed.

In regenerators used with furnaces of the Siemens type and other heat economizing furnace structures the regenerator chamber is usually provided with heat absorbing bodies, such as bricks made of refractory clay, such as fire brick, or of magnesia. For many purposes however both these materials are objectionable. Magnesia brick is expensive and does not well withstand violent temperature changes such as are incident to a regenerator. And with furnaces and kilns delivering basic dusts such as are carried away with the issuing waste gases from cement kilns and the like, fire brick does not stand up well. Basic materials form easily fusible compounds with the components of fire brick. In practice regenerators filled with fire brick resistors do not stand up well when used in combination with a cement kiln. The bricks are rapidly deteriorated and the channels between them are clogged. In the present invention in lieu of employing such materials, I use as a material for the heat absorbing bodies in regenerators cement and cement clinker. Cement clinker is refractory and resists the influence of basic dust at high temperature, while it does not deteriorate when subjected to changes of temperature. It is moreover cheap and easily procured. In connection with a cement kiln it presents the further advantage that it is of the same composition as the dust and if desired in cleaning out the regenerator the clinker and accumulated dust may be returned to the cement kiln.

I therefore regard this invention as particularly applicable to rotary kilns for the burning of cement such as the well known kilns employing heat regenerators of the Eldred type (see Patents Nos. 829,956 and 829,957, Sept. 4, 1906). The invention may however be applied to any other kiln or furnace delivering waste-carrying basic dust, such as the stationary furnace used in the Siemens-Martin process.

The cement or clinker may be used in a number of different ways. The regenerator may, for instance, be filled with stacked or piled pieces of Portland cement clinker such as are delivered from a rotary kiln. In stacking or piling the clinker in the chamber, of course the arrangement should be such as to provide sufficient voids to form channels for the passage of gases. The ordinary clinker is well suited for ordinary purposes and particularly when used in connection with a cement kiln; but where it is desired to have it stand exceptionally high temperature, the clinker may be made of a high-lime mixture.

The chamber itself may be shaped and constructed in any of the ordinary ways. Where stacked or piled clinker is employed however it is advantageous to provide means for the discharge of clinker at the bottom or sides of the chamber and for replacing with fresh material from above when cleaning out the regenerator. In placing such regenerator in use, cement clinker taken directly from the base of the kiln may be tumbled into the regenerator chamber. After using for a sufficient period of time, when flying dust has more or less clogged the spaces between the clinker bodies, the whole contents of the regenerator chamber may be drawn off and returned to the cement kiln. Or the dust may be removed and the clinker returned to the chamber; or the whole mass may be ground to form cement. In passing through a regenerator thus provided with pieces of cement clinker, the gases are efficiently purified, the dust being precipitated and collected in the interstices between the pieces.

In the accompanying illustration I have however shown more or less diagrammatically the invention as applied to one of the Eldred type of cement kilns.

In this showing: Figure 1 is a diagrammatic view in section of part of a cement plant, and Fig. 2 is a plan view, partly in section, showing two regenerator chambers and a clinkering kiln.

In the showing of Fig. 1, 1 is a rotary calcining kiln; 2 is a stationary housing for receiving the calcines; 3 is a flame producing means, shown as provided with coal inlet 4 and hot air duct 5. Calcines are discharged into hopper 6, whence they are carried by conveyer means 7 into the rotary clinkering kiln 8. The clinker passes through duct 9 into clinker pit 10, whence hot air for feeding the burner of the calcining kiln may be derived. As shown, the clinker kiln is mounted in the stationary housing 11 and is heated by coal heating means 12, blast for blowing in fuel being supplied through conduit 29 by fan 28. Regenerator 13 communicates with the clinkering kiln through ducts 14 and 15, the usual dust door 16 being provided. The regenerator communicates with the usual flue 17, valve mechanism 18 and stack 19. Within the regenerator are loosely piled clinkers 20. At the top the regenerator may be provided with false brick work 21 and at the base with similar false brick work 22 to permit of emptying and replenishing. As shown the clinker is merely tumbled in the regenerator in random arrangement.

With the valves 18 set as shown in Fig. 2, and assuming the mass of clinker in chamber 13 to have been previously highly heated by the waste gases from the clinkering kiln 8, air is drawn in through 30, passes through duct 17 into regenerator chamber 13, and thence into the clinkering kiln 8 via ducts 14, 15 and 26. The waste gases from the combustion in the clinkering kiln pass out through duct 27 into chamber 13ª, where they give up their heat to the mass of clinker 20, and after being thus cooled pass out through ducts 17ª and 17ᵇ and into the stack 19. With the valves 18 set as shown dotted, air is drawn in through 31 and passes in the reverse direction through the regenerator chambers and clinkering kiln, and pass out as before through stack 19.

What I claim is:—

1. In a regenerative furnace, a heat regenerator chamber and masses of cement clinker disposed therein to absorb and to deliver heat.

2. In combination, a rotary cement kiln, regenerator chambers suitably connected with said kiln, and bodies comprising cement clinker disposed in said regenerator chambers to absorb and to deliver heat.

In testimony whereof I have signed my name to this specification in the presence of two subscribing witnesses.

BRUNO BRUHN.

Witnesses:
HENRY HASPER,
WOLDEMAR HAUPT.

---

Copies of this patent may be obtained for five cents each, by addressing the "Commissioner of Patents, Washington, D. C."